Oct. 20, 1931.   H. D. CHURCH   1,827,781
MOTOR VEHICLE RADIATOR
Filed Oct. 24, 1927
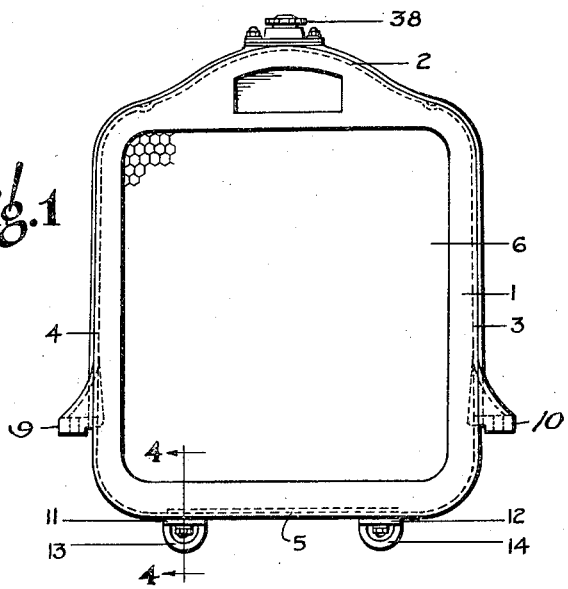
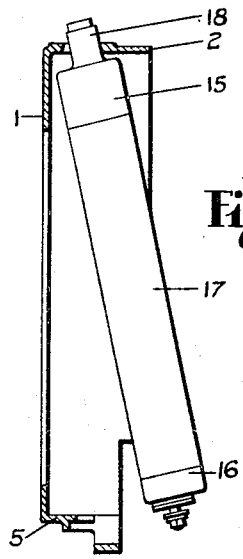
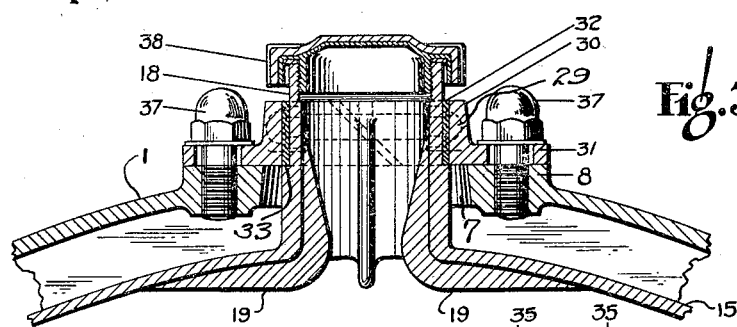
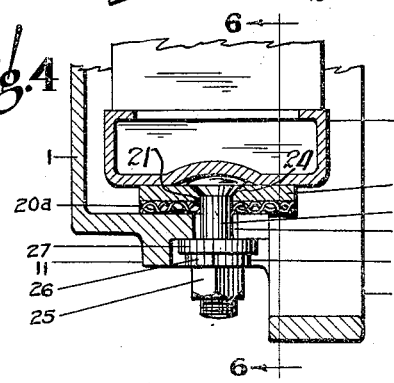
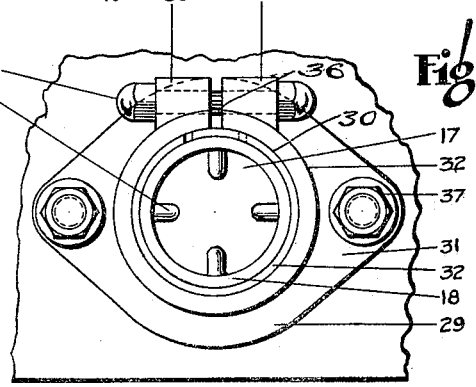
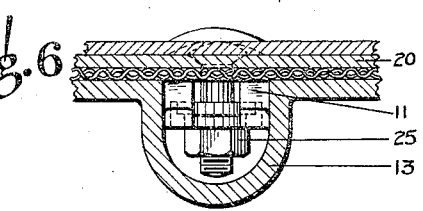
INVENTOR
HAROLD D. CHURCH
BY
ATTORNEY Patented Oct. 20, 1931

1,827,781

UNITED STATES PATENT OFFICE

HAROLD D. CHURCH, OF CLEVELAND HEIGHTS, OHIO, ASSIGNOR TO THE WHITE MOTOR COMPANY, OF CLEVELAND, OHIO, A CORPORATION OF OHIO

MOTOR VEHICLE RADIATOR

Application filed October 24, 1927. Serial No. 228,370.

This invention relates to radiators for automotive vehicles, and more particularly to improvements in the construction and organization of the elements provided to unite the radiator shell and core.

One object of this invention is to construct a radiator shell having a clamping member which is adapted to accommodate the ready insertion or removal of a radiating element, and also capable of effecting the rigid securement of the radiator core within the shell.

Another object of the invention is to provide a radiator core tank having a filler neck integrally formed therewith and so constructed as to provide a support for the radiating element within the shell.

Other objects will hereinafter appear.

The invention itself will be more readily understood from the description of one practical embodiment thereof, illustrated in the accompanying drawings in which:

Figure 1 is a front elevation of a radiator embracing the different features of the invention.

Figure 2 is a diagrammatic view showing the relative position of the parts at an intermediate stage in the placement or displacement of the core relative to its position within the radiator casing.

Figure 3 is an enlarged fragmentary transverse section taken through the center of the radiator.

Figure 4 is a detailed view in section showing the construction of the lower portion of the radiator and core, the section being taken on the line 4—4 in Figure 1.

Figure 5 is an enlarged fragmentary plan view of the radiator with the radiator cap removed, and Figure 6 is a section taken on line 6—6 of Figure 4.

Referring to the drawings in which like parts are designated by like reference characters, the radiator casing, or shell 1 is generally rectangular in outline and is formed with an open front face having peripheral rearwardly extending flange walls 2, 3, 4, and 5 encasing the radiator core 6. The upper flange wall is arched and has formed therein at the apex of the arch a circular aperture 7 surrounded by an upward extending elliptical boss 8. The side flange walls 3 and 4 carry laterally extending supporting lugs 9 and 10, and the base flange 5 is formed with a pair of depending slotted bosses 11 and 12 provided with arched reinforcing flanges 13 and 14 bridging the slotted portions of the bosses.

The radiating section, or core 6, comprises upper and lower tank portions 15 and 16 and intercommunicating cellular portion 17. The upper tank 15 is preferably constructed of a unitary casting which is provided with an integrally formed neck 18 reinforced with radially extending flanges 19 disposed within the inner periphery of the neck parallel with the medial axis thereof. A strip 20 is secured to the bottom surface of the lower tank 16, in any suitable manner, such as by soldering the contiguous surfaces of the strip 20 and the bottom wall of the tank 16 together. Prior to the attachment of the strip 20, two apertures 21 adapted to register with the slots 22 in the bosses 11 and 12, are formed in the said strip for reception of bolts 23. The apertures are countersunk in their upper portions so that the bolt head 24 is held between such countersunk portions and the lower surface of bottom wall of the tank 16.

When the core is in its secured position within the casing, the parts take the position illustrated in Figures 4 and 6 wherein the stems of the bolts 23 extend through the slots 22 in the bosses 11 and 12, which depend from the lower flange wall 5 of the casing. The stems of the bolts carry on their lower ends clamping nuts 25 and a pair of washers 26 and 27. The bosses 11 and 12 are provided with countersunk pilot seats 28, upon which the washers 27 are seated in a position concentric with the bolts 23. To effectuate the insertion or removal of the core, the nuts 25 are turned to a position that will permit the washers 27 to drop below the lower plane of the bosses 11 and 12.

Referring now to Figure 2, it will be seen how the core is inserted into the casing. Advancing the core from the position illustrated, which is slightly below and to the rear of its normal position, the neck 18 is inserted within the aperture 7, and the lower portion of the core is gradually elevated and moved forwardly into the casing until the shanks of bolts 23, which enter the slots 22, are aligned with the axes of the counterbored pilot seats 28. The arched flanges 13 and 14 have their lowermost portions sufficiently depressed from the plane of the flange 5 to clear the ends of the bolts 23 during insertion of the core. When the bolts 23 have been aligned with the axes of the counterbored pilot seats, the core is in its ultimate position with the neck 18 projecting completely through the aperture 7. The washers 27 are then guided into their countersunk seats 28, and the clamping nuts 25 turned to a clamping position. A fabric strip 20a interposed between the strip 20 and the flange wall 5 cushions the radiator core against the deleterious effects of jars and shocks. The top of the radiator core is secured in position by a split clamping member 29 comprising a cylindrical portion 30, and a flange portion 31 extending laterally outward from the base of said cylinder portion, the outer periphery of which conforms to that of the boss 8.

The upper portion of the neck 18 is of smaller exterior diameter than lower portion, and is surrounded by a removable split-ring bushing 32 supported by a shoulder 33 formed at the junction of the sections. The clamp 29 is placed over the neck 18 and the bushing 32, after which it is contracted by means of a bolt 34 which passes through lugs 35 extending outwardly from the cylindrical portion 30 on opposite sides of the slit 36. Contraction of the clamp 29 causes a like contraction of the split bushing, 32, and securely clamps the neck, bushing and clamp together. Threaded studs 37 extending through apertures formed in the flange 31, and screw threaded into apertures formed in the boss 8, secure the clamp 29 to the casing 1.

The apertures formed in the flange 31 are preferably made large enough to permit contraction and expansion of the clamp 29 with studs 37 in place. A radiator cap 38 is provided to close the filling aperture in the neck 18, and is preferably, as illustrated, screw threaded into the internally threaded upper portion of the neck.

It will be obvious that various changes may be made in the details of construction of the various parts described herein and in their manner of arrangement without departing from the spirit of the invention, and it will be understood that the invention is not limited to the precise construction and arrangement shown and described.

I claim as my invention,—

1. In a radiator assembly, the combination of a casing, a core disposed within said casing provided with a filling neck reinforced with radially extending flanges disposed on the inner periphery thereof, means for attaching said neck to said casing, and means for attaching said core at other points to said casing.

2. In a radiator assembly, the combination of a casing, a core disposed within said casing and provided with a filling neck reinforced with radially extending flanges disposed on the inner periphery thereof, and a clamping member clamped to said neck and secured to said casing.

3. In a radiator assembly, the combination of a casing, a core disposed within said casing and provided with a filling neck, a split bushing surrounding said neck, a clamping member encircling both said bushing and said neck securing the bushing, neck and clamping member together, and means for securing said clamping member to said casing.

4. In a radiator assembly, the combination of a casing, a core disposed within said casing and provided with a filling neck reinforced with integrally formed flanges, a split bushing surrounding said neck, a clamping member encircling both said bushing and said neck securing the bushing, neck and clamping member together, and means for securing said clamping member to said casing.

5. In a radiator assembly, the combination of a casing, a core disposed within said casing and provided with a filling neck reinforced with radially disposed flanges formed on the inner periphery thereof, a split bushing surrounding said neck, a clamping member encircling both said bushing and said neck securing the bushing, neck and clamping member together, and means for securing said clamping member to said casing.

6. In a radiator assembly, the combination of a casing, a removable core disposed within said casing and provided with a filling neck reinforced with longitudinally extending flanges, means for attaching said neck to said casing, and means spaced from said neck for attaching said core to said casing.

7. In a radiator assembly, the combination of a casing, a removable core disposed within said casing and provided with a filling neck, a member extending between said neck and said casing, means for detachably securing said member to said neck, means for detachably securing said member to said casing, and means spaced from said neck for detachably securing said core to said casing.

8. In a radiator assembly, the combination of a casing, a removable core disposed within said casing and provided with a filling neck, a clamping member encircling said neck, means for clamping said member upon said neck, means for detachably securing said member to said casing, and means spaced from said neck for securing said core to said casing.

In testimony whereof I hereunto affix my signature this 21st day of October, 1927.

HAROLD D. CHURCH.